(12) United States Patent
Wada et al.

(10) Patent No.: US 6,456,227 B2
(45) Date of Patent: Sep. 24, 2002

(54) WEATHER RADAR

(75) Inventors: Masakazu Wada, Kawasaki; Yasuhiro Katsuyama, Yokohama, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/818,845

(22) Filed: Mar. 28, 2001

(30) Foreign Application Priority Data

Jul. 14, 2000 (JP) ........................................ 2000-215024

(51) Int. Cl.$^7$ ................................................ G01S 13/95
(52) U.S. Cl. ............................ 342/26; 342/74; 342/75; 342/81; 342/192; 342/195; 342/196
(58) Field of Search ........................... 342/26, 147, 175, 342/192–197, 27, 28, 73, 74, 75, 76, 77–81, 104–118, 134–144; 73/170.13

(56) References Cited

U.S. PATENT DOCUMENTS

| | | | |
|---|---|---|---|
| 3,139,617 A | * | 6/1964 | Denman et al. ............. 342/104 |
| 3,193,825 A | * | 7/1965 | Lhermitte ................... 342/26 |
| 3,197,768 A | * | 7/1965 | Lhermitte ................... 342/26 |
| 3,212,085 A | * | 10/1965 | Lhermitte et al. ............ 342/26 |
| 4,351,188 A | * | 9/1982 | Fukushima et al. ....... 73/170.13 |
| 4,748,448 A | * | 5/1988 | Thompson ................... 342/26 |
| 4,761,650 A | | 8/1988 | Masuda et al. |
| 5,175,551 A | | 12/1992 | Rubin |
| 5,264,852 A | * | 11/1993 | Marquet ...................... 342/26 |
| 5,359,330 A | | 10/1994 | Rubin et al. |
| 5,623,267 A | | 4/1997 | Wurman |
| 6,137,433 A | * | 10/2000 | Zavorotny et al. ............ 342/26 |

FOREIGN PATENT DOCUMENTS

| | | |
|---|---|---|
| JP | 9-90034 | 4/1997 |
| JP | 2000-338238 | 12/2000 |
| JP | 2001-21668 | 1/2001 |

* cited by examiner

*Primary Examiner*—Bernarr E. Gregory
(74) *Attorney, Agent, or Firm*—Oblon, Spivak, McClelland, Maier & Neustadt, P.C.

(57) ABSTRACT

An antenna section radiates a pulse beam and receives its reflected wave, and a signal processing section observes a rain or cloud occurring region within a covered area based on a signal intensity of the reflected wave. In this case, to obtain wind direction and velocity information for the rain or cloud occurring region, the signal processing section observes Rayleigh scattering-induced Doppler echo components in that region to calculate the wind direction and velocity from a result of the observation. To obtain the wind direction and velocity information for a region other than the rain or cloud occurring area, the beam formed by the antenna section is directed toward the region to be observed so that the signal processing section can observe Bragg scattering-induced echo components based on a received signal of the reflected wave to calculate the wind direction and velocity from a result of the observation.

6 Claims, 6 Drawing Sheets

WEATHER RADAR

CROSS-REFERENCE TO RELATED APPLICATIONS

This application is based upon and claims the benefit of priority from the prior Japanese Patent Application No. 2000-215024, filed Jul. 14, 2000, the entire contents of which are incorporated herein by reference.

BACKGROUND OF THE INVENTION

1. Field of the Invention

The present invention relates to a weather radar belonging to meteorological equipment for calculating the presence of water droplets and wind direction and velocity from reflected electromagnetic waves.

2. Description of the Related Art

Conventional weather radars are meteorological sensors that observe a distribution of water droplets from waves reflected from water droplets such as clouds or rain due to Rayleigh scattering. In particular, weather Doppler radars do not only observe a distribution of water droplets but also observe the moving speed of the water droplets based on Doppler components of the reflected waves, thus making it possible to calculate wind direction and velocity for a space containing the water droplets. Thus, the current weather radars can calculate the wind direction and velocity only from regions with water droplets present therein.

BRIEF SUMMARY OF THE INVENTION

As described above, the conventional weather radars can calculate the wind direction and speed only in the presence of water droplets.

The present invention is provided to solve this problem, and it is an object thereof to provide a weather radar that can execute wind observations despite the lack of Doppler echoes from water droplets such as rain or clouds.

A weather radar according to the present invention has the following characteristic configurations:

(1) A weather radar for using an antenna that can control a beam direction to radiate a pulse beam and receive a reflected wave in order to observe a rain or cloud occurring region within a covered area based on a signal intensity of the reflected wave, the weather radar comprising Bragg scattering observing means for arranging a beam formed by the antenna, in an arbitrary direction and observing Bragg scattering-induced echo components based on a received signal of the reflected wave to thereby calculate a distribution of wind direction and velocity relative to the beam direction from a result of the observation.

(2) A weather radar for using an antenna that can control a beam direction to radiate a pulse beam and receive a reflected wave in order to observe a rain or cloud occurring region within a covered area based on a signal intensity of the reflected wave, the weather radar comprising Rayleigh scattering observing means for directing a beam formed by the antenna toward the rain or cloud occurring region and observing Rayleigh scattering-induced Doppler echo components based on a received signal of the reflected wave to calculate a distribution of wind direction and velocity based on a result of the observation, and Bragg scattering observing means for arranging the beam formed by the antenna, in an arbitrary direction and observing Bragg scattering-induced echo components based on the received signal of the reflected wave to thereby calculate a distribution of wind direction and velocity relative to the beam direction from a result of the observation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the drawings.

To enable wind observations despite the lack of water droplet components, the weather radar of this embodiment has an additional function of observing Bragg scattering-induced reflected waves in addition to Rayleigh scattering-induced reflected waves to identify a turbulent region in order to calculate wind direction and velocity from movement of the turbulent region.

Figure 1:
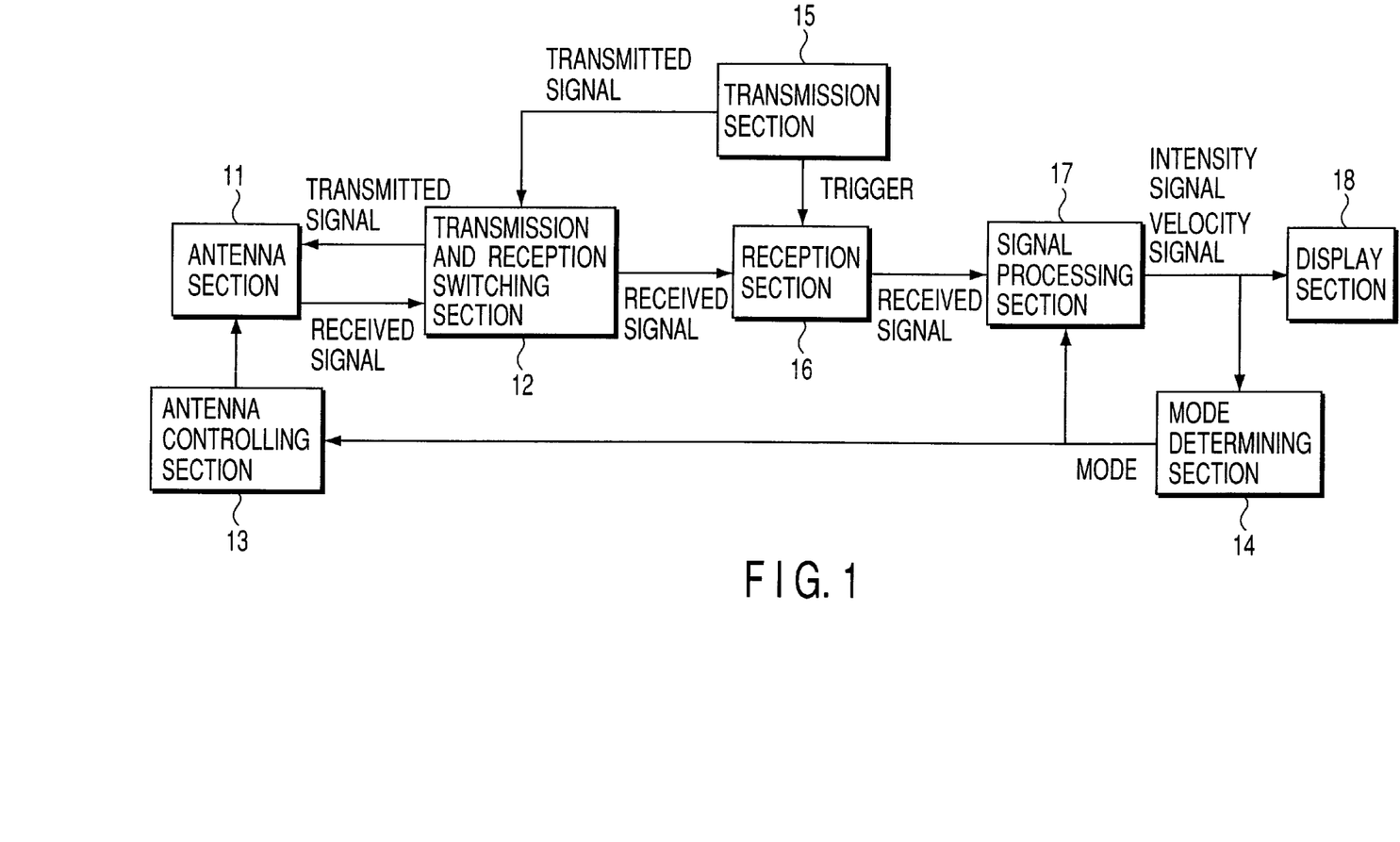
FIG. 1 is a block diagram showing the configuration of one embodiment of a weather radar according to the present invention.

FIG. 1 shows the configuration of a weather radar with its wind observing function improved by the present invention. An antenna section 11 has a function of transmitting a transmitted pulse signal input from a transmission and reception switching section 12 in a beam direction as an electric wave and receiving its reflected wave to output a corresponding received signal to the transmission and reception switching section 12.

An antenna controlling section 13 has a function of changing a scanning pattern in the beam direction relative to the antenna section 11, depending on mode information from a mode determining section 14.

The transmission and reception section 12 has a function of executing signal switching to output a transmitted pulse signal from a transmission section 15 to the antenna section 11 while outputting a received signal from the antenna section 11 to a reception section 16.

The transmission section 15 has functions of generating a repeated transmitted pulse signal with a cycle dependent on a searching distance and outputting the signal to the transmission and reception switching section 12 and of generating a trigger signal indicative of a pulse transmission timing and outputting it to the reception section 16.

The reception section 16 has a function of loading the received signal from the transmission and reception switching section 12 at intervals of the trigger signal from the transmission section, executing processes such as frequency conversion and amplification, and then outputting the resulting signal to a signal processing section 17.

The signal processing section 17 has a function of subjecting the signal input from the reception section 16 to various signal processes (FFT process, frequency spectrum integrating process, velocity calculating process, etc.) depending on the mode information from the mode determining section 14 to extract intensity (precipitation information) and velocity (wind velocity information) components and the like and then outputting this information to the mode determining section 14 and a display section 18.

The mode determining section 14 determines whether a main observation is either for rain and clouds or for turbulence and outputs corresponding mode information (rain and clouds observing mode/turbulence observing mode) to the signal processing section 17 and the antenna controlling section 13.

The display section 18 has a function of displaying a three-dimensional distribution of precipitation or a distribution of wind direction and velocity in an arbitrary direction on a screen based on the information input from the signal processing section 17.

Next, an example of operations characteristic of the present invention will be explained. In the configuration shown in FIG. 1, the characteristic operations of the present invention are those of the antenna controlling section 13, the signal processing section 17, and the mode determining section 14. The operations of these three components will be described below in comparison with the prior art.

First, an example of operations of the antenna controlling section 13 in different modes will be explained.

Figure 2:
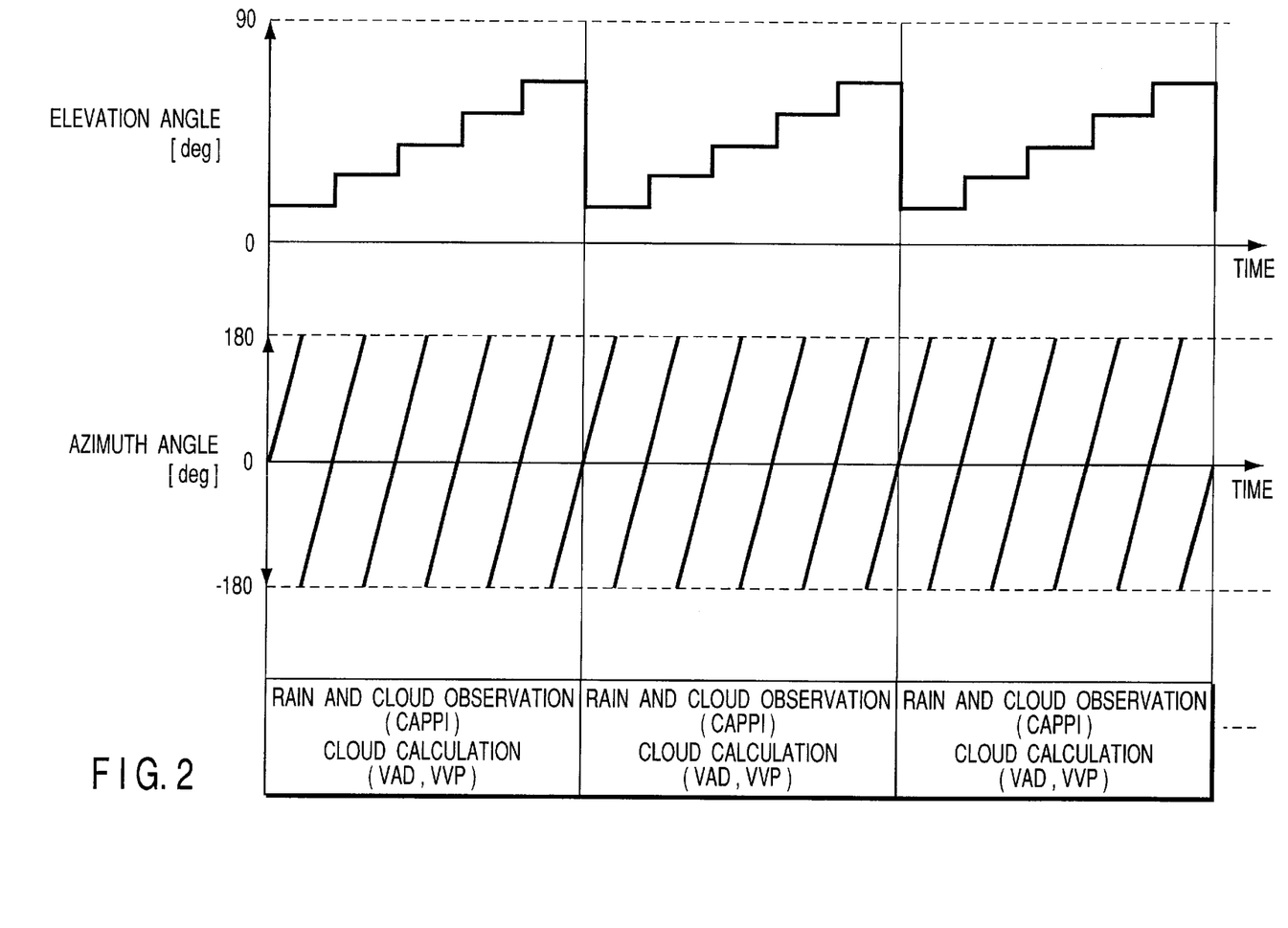
FIG. 2 is a pattern waveform diagram showing a beam scanning pattern of a conventional weather radar in comparison with a beam scanning pattern of the weather radar of this embodiment.

As shown in FIG. 2, the conventional weather radar rotates the beam direction at a constant speed to scan all azimuths, varies elevation angle with each rotation from a small value to a large value to execute rain and cloud observations (CAPPI: Constant Altitude PPI) and wind calculations (VAD: Velocity Azimuth Display, VVP: Volume Velocity Processing) for each elevation angle, and repeats these observations.

On the other hand, conventional meteorological sensors for determining the wind direction and velocity using Bragg scattering include wind profilers and boundary layer radars. These meteorological sensors sequentially observe turbulence in three directions for a fixed period, the directions including a zenith direction and two others (for example, a north and east directions) inclined through several degrees from the zenith direction and through 90° from each other, and compares turbulence conditions in these directions to calculate the wind direction and velocity at each altitude.

Figure 3:
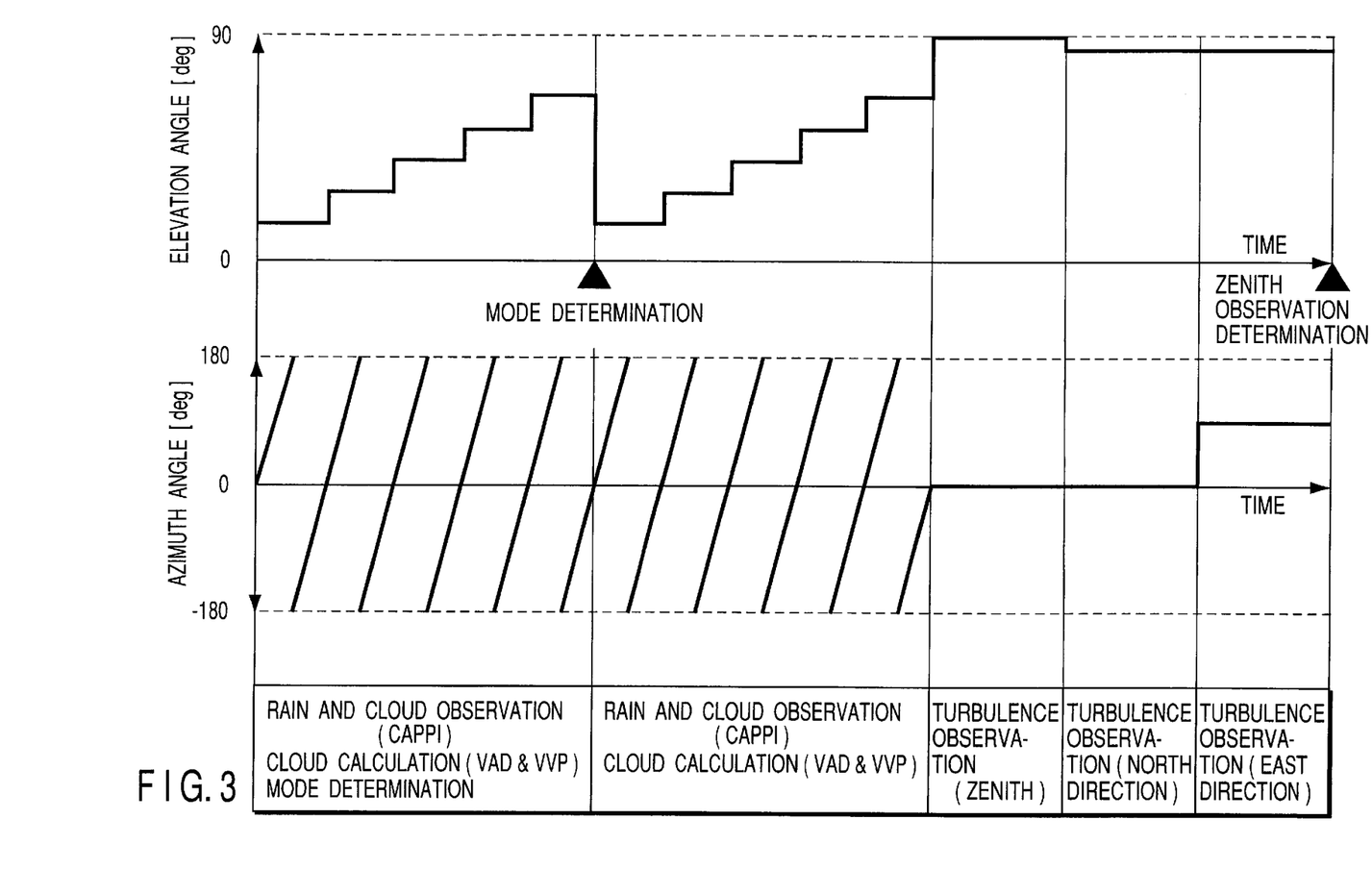
FIG. 3 is a pattern waveform diagram showing a beam scanning pattern of the weather radar of this embodiment observed in connection with a rainy region having a fixed ratio or more.
Figure 4:
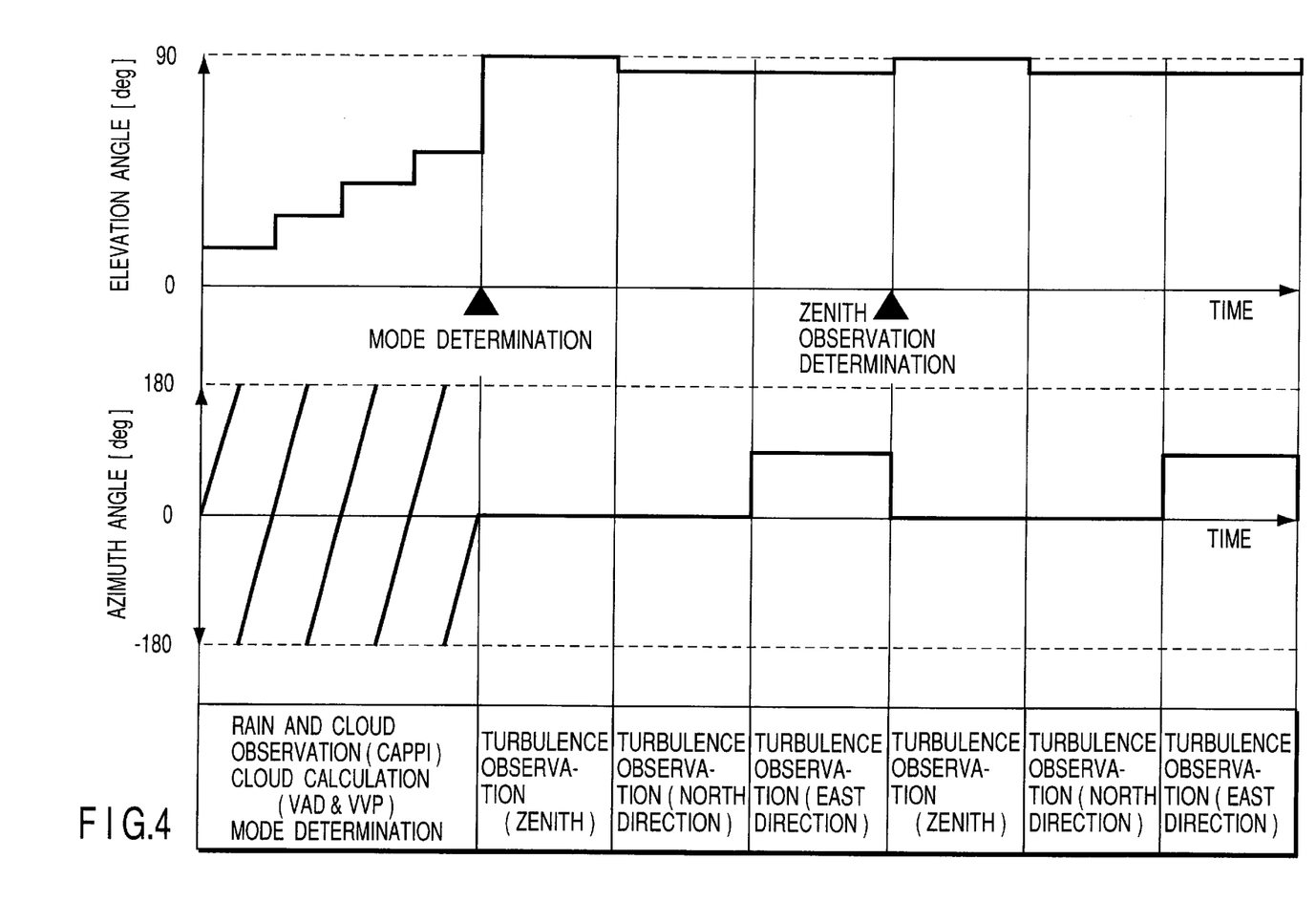
FIG. 4 is a pattern waveform diagram showing a beam scanning pattern of the weather radar of this embodiment observed in connection with a rainy region having a ratio smaller than the fixed value.

In contrast, the weather radar of this embodiment is characterized by switching the rain and cloud observing mode and the turbulence observing mode within a unit observation period in a time series manner using the antenna scanning pattern shown in FIG. 3 or 4. The ratio between these observing modes is properly selected based on the ratio of a rainy region to the entire covered area.

As shown in FIGS. 3 and 4, the rain and cloud observing mode is first set and the mode is determined by determining the ratio of a rainy region. If the rainy region has a fixed ratio or more, then as shown in FIG. 3, the radar principally executes the CAPPI sequence-based rain and cloud observation and VAD and VVP-based wind observation as executed in the conventional weather radar. On the other hand, if the rainy region has a ratio smaller than the fixed value, then as shown in FIG. 4, the radar principally executes turbulence observation in a fixed direction (in FIG. 4, the zenith direction).

In this case, since Bragg scattering-induced reflected waves have a lower electric-wave intensity that Rayleigh scattering-induced reflected waves, the observation is executed with the beam from the antenna maintained in the observation direction for a fixed amount of time. Accordingly, calculating the wind direction and velocity from the observation of Rayleigh scattering-induced Doppler echoes is more efficient than that from the observation of Bragg scattering-induced Doppler echoes. Thus, the observation of Bragg scattering-induced echoes is limited to regions other than those where rain or clouds are occurring.

Whether the main observation is either for rain and clouds or for turbulence is determined by the mode determining section 14, described later, based on the first CAPPI-based rainy-region information. Further, although turbulence is observed in the zenith direction in the example of the antenna scanning pattern shown in FIGS. 3 and 4, the present invention does not limit the turbulence observation to the zenith direction but enables this observation in any directions depending on various applications.

Next, an example of the operation of the signal processing section 17 will be described.

Figure 5:
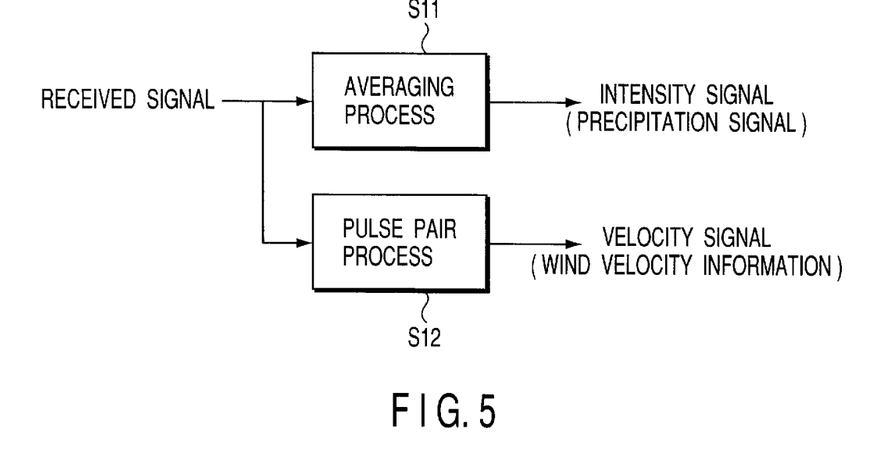
FIG. 5 is a system diagram showing a signal process procedure for the conventional weather radar in comparison with a signal process procedure for the weather radar of this embodiment.
Figure 6:
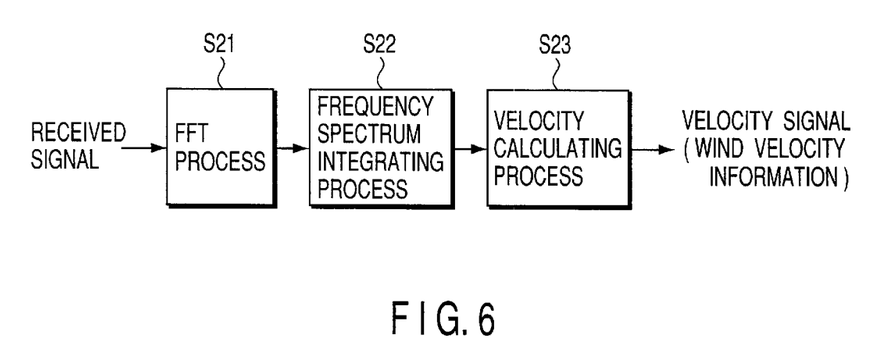
FIG. 6 is a system diagram showing a signal process procedure for a conventional wind profiler or boundary layer radar in comparison with a signal process procedure for the weather radar of this embodiment.

First, as shown in FIG. 5, signal processing executed by the conventional weather radars comprises averaging received signals (S11) to determine an intensity signal (precipitation information) and executes a pulse pairing process (S12) to determine a velocity signal (wind velocity information). Further, as shown in FIG. 6, signal processing executed by the wind profiler or boundary layer radar comprises subjecting received signals to an FFT (Fast Fourier Transform) process (S21) to convert signals for time axis regions into those for frequency axis regions, and executing a frequency spectrum integrating process (S22) and then a velocity calculating process (S23) to obtain the velocity signal (wind velocity information).

Figure 7:
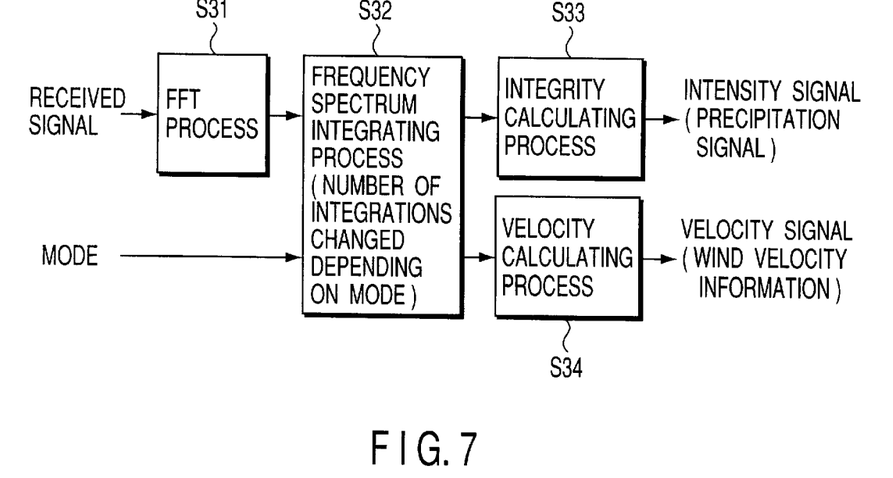
FIG. 7 is a system diagram showing a signal process procedure for the weather radar of this embodiment.

In contrast, as shown in FIG. 7, signal processing executed by the weather radar of this embodiment comprises subjecting received signals to the FFT process (S31), subsequently executing the frequency spectrum integrating process (S32), and then executing an intensity calculating process (S33) and the velocity calculating process (S34) based on a result of the integration process to obtain the intensity signal (precipitation information) and the velocity signal (wind velocity information).

In this case, the intensity of Bragg scattering-induced echoes is significantly lower than that of Rayleigh scattering-induced echoes. Thus, during the frequency spectrum integrating process (S32), the number of integrations is changed based on the mode information. For example, the frequency spectrum integrating process is executed once in the rain and cloud observing mode, whereas it is executed several times in the turbulence observing mode in order to obtain a desired S/N ratio.

Next, an example of the operation of the mode determining section 14 will be explained.

The mode determining section 14 inputs rainy-area information including that on the zenith from the signal processing section 17 and determines whether the rainy region has a fixed ratio or more to determine whether the main observation is to be either for rain and clouds or for turbulence. The mode determining section 14 then outputs this information (rain and cloud observing mode/turbulence observing mode) to the signal processing section 17 and the antenna controlling section 13.

Figure 8:
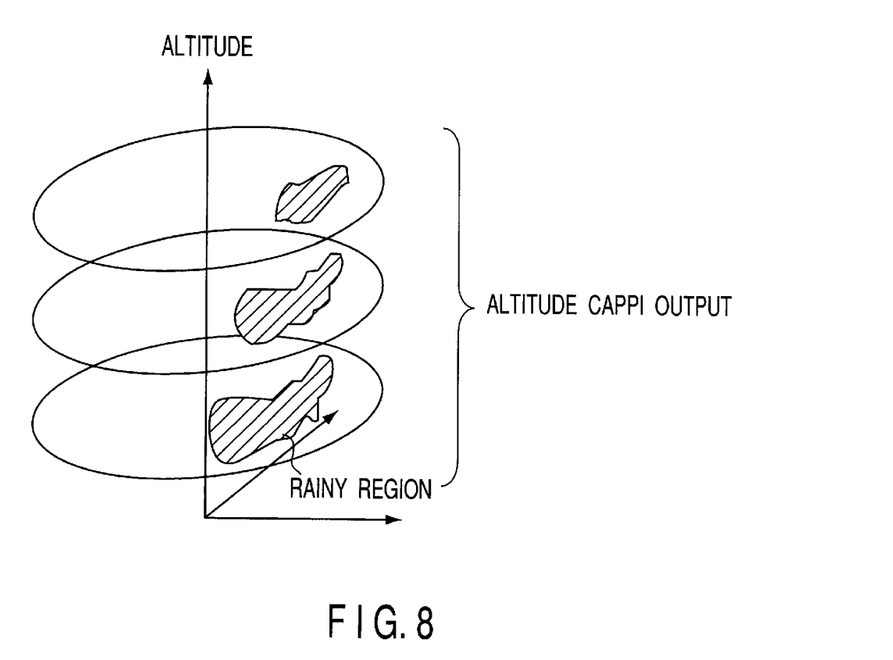
FIG. 8 is a view showing an example of altitude CAPP output which is useful in explaining an example of a mode determining criterion according to this embodiment.

An example of a specific determination criterion will be shown below. As shown in FIG. 8, if the rainy region has a fixed ratio or more to the entire covered area in the altitude CAPPI output including that for the zenith direction, then the mode is set in which rain and clouds are principally observed, whereas if the rainy region has a ratio smaller than the fixed value, then the mode is set in which turbulence is principally observed.

However, even in the mode in which turbulence is principally observed, rain and clouds are chiefly observed if precipitation is present in the observation direction. In particular, in the observation of Bragg scattering-induced turbulence, if the reception intensity has a fixed value or more due to the effect of Rayleigh scattering, it is determined that precipitation is present and the mode is switched to the one in which rain and clouds are chiefly observed.

As is apparent from the above description, the weather radar configured according to this embodiment obtains the wind direction and velocity information from Rayleigh scattering-induced Doppler echo components for regions with water droplet components and from Bragg scattering-induced echo components for areas without any water droplet components, thereby obtaining the wind direction and velocity information regardless of the presence of water droplet components. Therefore, the wind direction and velocity information can be obtained from all the regions of the covered area.

A weather radar is compared with a wind profiler using Bragg scattering-induced echo components. Since the wind profiler uses electric waves of a VHF or UHF band, its antenna require a very large opening area of several tens of meters on all sides and thus requires the direction thereof to be fixed. Since, however, the weather radar uses electric waves in a C or X band and requires an opening area in the order of several meters in radius, it can be arranged in an arbitrary direction.

Thus, the weather radar can directly observe a very small-scale meteorological phenomenon such as turbulence (microburst or the like) near runways in an airport, for example.

Consequently, the weather radar of the present invention, having both of the above functions, can obtain the wind direction and velocity information without depending on the occurrence of rain or clouds and can thus be used in various applications.

As described above, since the weather radar of the present invention has the function of observing Bragg scattering-induced turbulence and can thus calculate a distribution of the wind direction and velocity in an arbitrary direction within the covered area despite the lack of Doppler echoes from water droplets such as rain or clouds.

Therefore, the present invention can provide a weather radar that can execute wind observations despite the lack of Doppler echoes from water droplets such as rain or clouds.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A weather radar for using an antenna allowed to control a beam direction to radiate a pulse beam and receive a reflected wave in order to observe a rain or cloud occurring region within a covered area based on a signal intensity of the reflected wave, the weather radar comprising:

Bragg scattering observing means for arranging a beam formed by said antenna, in an arbitrary direction and observing Bragg scattering-induced echo components based on a received signal of said reflected wave; and wind direction and velocity distribution calculating means for calculating distribution of wind direction and velocity with respect to the beam direction from a result of observation by said Bragg scattering observing means.

2. A weather radar for using an antenna allowed to control a beam direction to radiate a pulse beam and receive a reflected wave in order to observe a rain or cloud occurring region within a covered area based on a signal intensity of the reflected wave, the weather radar comprising:

Rayleigh scattering observing means for directing a beam formed by said antenna toward said rain or cloud occurring region and observing Rayleigh scattering-induced Doppler echo components based on a received signal of the reflected wave;

Bragg scattering observing means for arranging the beam formed by said antenna, in an arbitrary direction and observing Bragg scattering-induced echo components based on the received signal of said reflected wave;

observation controlling means for selectively switching said Rayleigh scattering observing means and said Bragg scattering observing means to control the observation by said Rayleigh scattering observing means and observation by said Bragg scattering observing means; and wind direction and velocity distribution calculating means for calculating the distribution of wind direction and velocity from the result of the observation by one of said Rayleigh and Bragg scattering observing means which is elected by said observation controlling means.

3. A weather radar according to claim 1 or 2, wherein during observation, said Bragg scattering observing means fixes the direction of the beam formed by said antenna to accumulate observed echo components.

4. A weather radar according to claim 2, wherein said observation controlling means causes said Rayleigh scattering observing means to swing the direction of the beam formed by said antenna within a unit observation cycle while observing Rayleigh scattering-induced echo components for a plurality of elevation angles to determine a rain or cloud occurring region within said covered area and selectively uses said Bragg scattering observing means based on this rain or cloud occurring region information.

5. A weather radar according to claim 2, wherein said observation controlling means causes said Rayleigh scattering observing means to swing the direction of the beam formed by said antenna within a unit observation cycle while observing Rayleigh scattering-induced echo components for a plurality of elevation angles to determine a rain or cloud occurring region within said covered area and selectively uses said Rayleigh scattering observing means and said Bragg scattering observing means in a time series manner based on a ratio of this rain or cloud occurring region to the covered area.

6. A weather radar according to claim 2, wherein during observation, said Rayleigh scattering observing means swings the direction of the beam formed by said antenna while observing Rayleigh scattering-induced echo components for a plurality of elevation angles, and during observation, said Bragg scattering observing means fixes the direction of the beam formed by said antenna to observe echo components.

* * * * *